United States Patent [19]
Macomber et al.

[11] 3,749,268
[45] July 31, 1973

[54] AUTOMATIC FREIGHT HANDLING APPARATUS FOR HIGHWAY TRAILERS

[75] Inventors: Franklin S. Macomber, Park Ridge, Ill.; Wayne E. Hunnicutt, Big Bend, Wis.

[73] Assignee: A. T. Kearney & Company, Inc., Chicago, Ill.

[22] Filed: June 16, 1971

[21] Appl. No.: 153,758

[52] U.S. Cl. .................. 214/516, 198/85, 214/518, 214/152
[51] Int. Cl. .............................................. B60p 1/64
[58] Field of Search ............ 214/518, 519, 16.1 CD, 214/152, 516; 198/19, 85

[56] References Cited
UNITED STATES PATENTS

| | | |
|---|---|---|
| 3,559,831 | 2/1971 | Weston .............................. 214/518 |
| 2,999,579 | 9/1961 | Kostrzewa ............................. 198/19 |
| 2,903,120 | 9/1959 | Thomas .................... 214/16.1 CD X |
| 2,258,530 | 10/1941 | Auger et al. ................ 214/16.1 CD |
| 2,846,087 | 8/1958 | Nilsson et al. ............... 214/16.1 CD |
| 2,201,939 | 5/1940 | Auger et al. ................ 214/16.1 CD |

Primary Examiner—Albert J. Makay
Attorney—Lee J. Gary, Charles F. Pigott, Jr. et al.

[57] ABSTRACT

Apparatus mounted within a highway trailer or the like which automatically moves a predetermined number of cargo containers along a predetermined endless path within the trailer for the purpose of locating a selected cargo container in a predetermined loading and unloading position.

21 Claims, 12 Drawing Figures

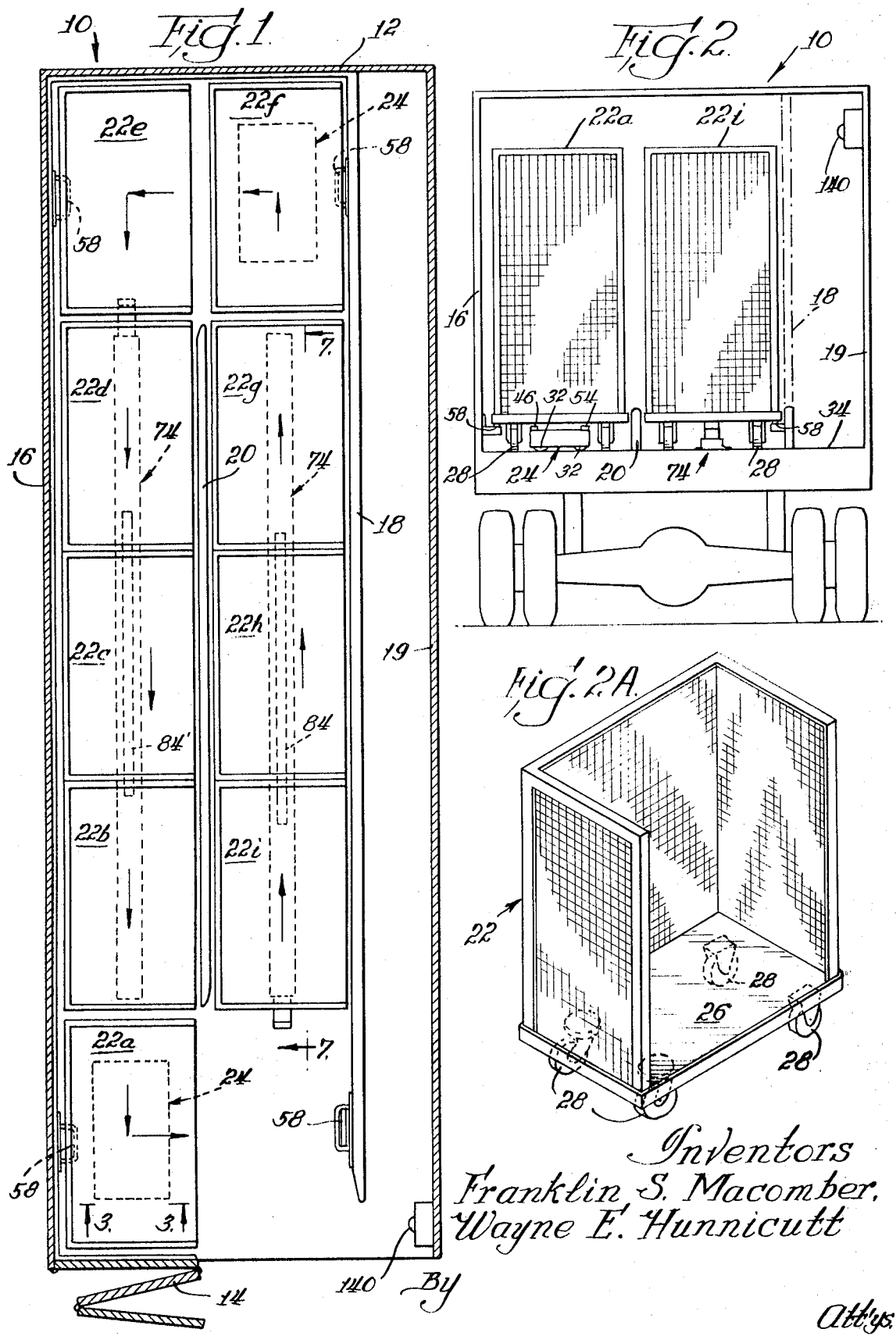

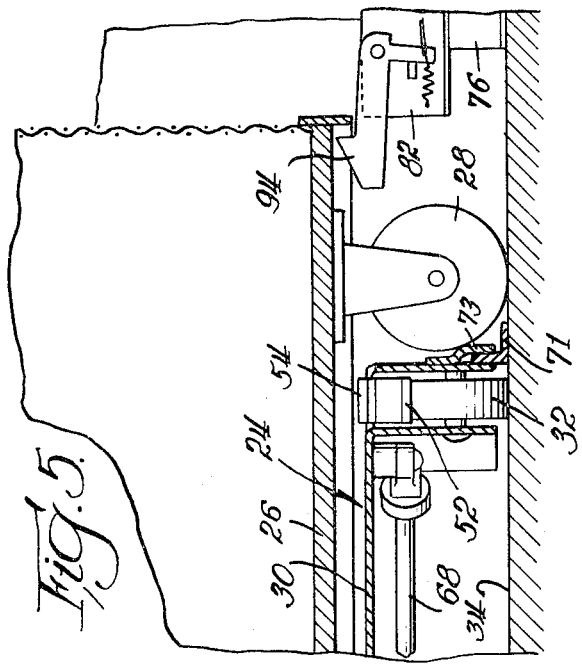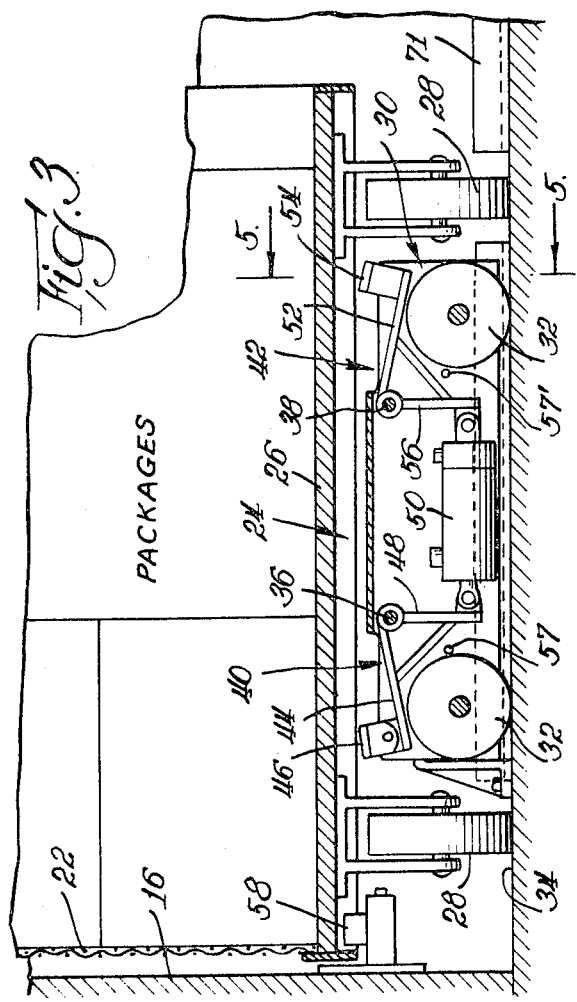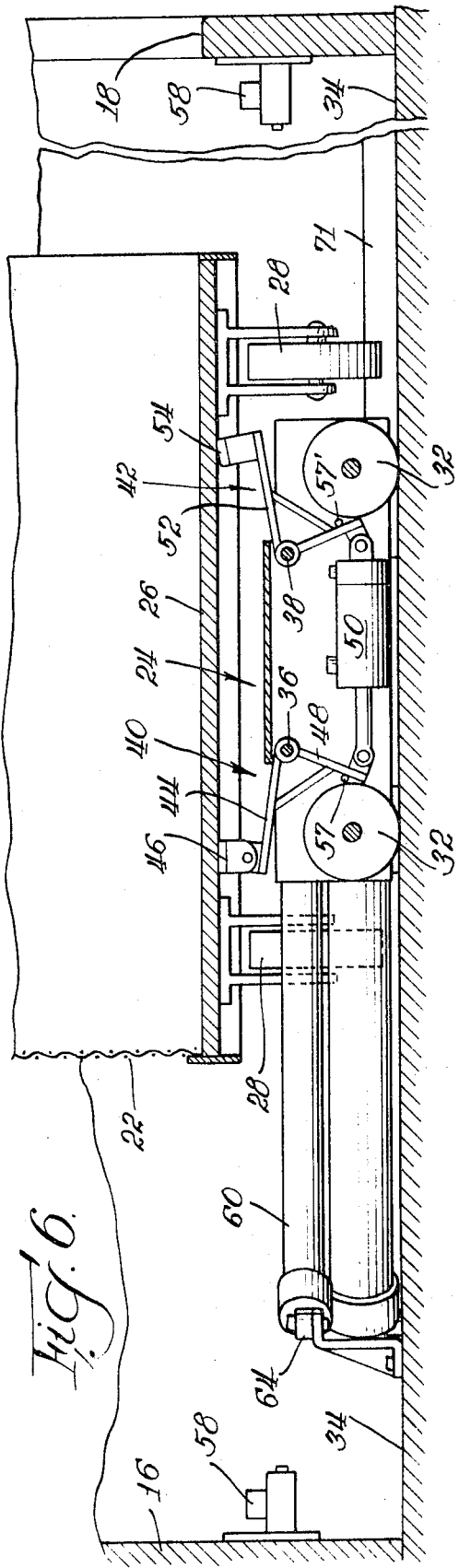

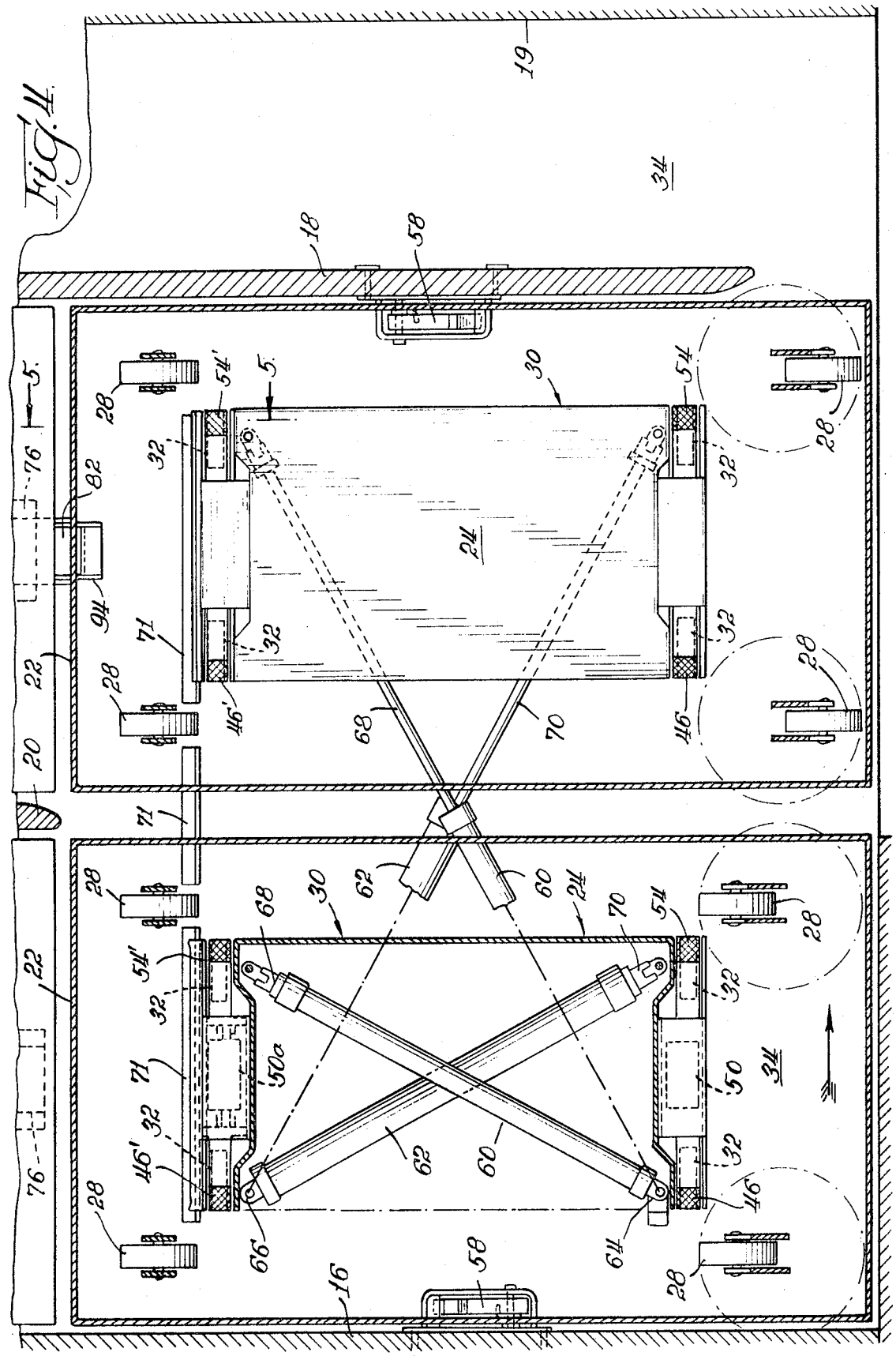

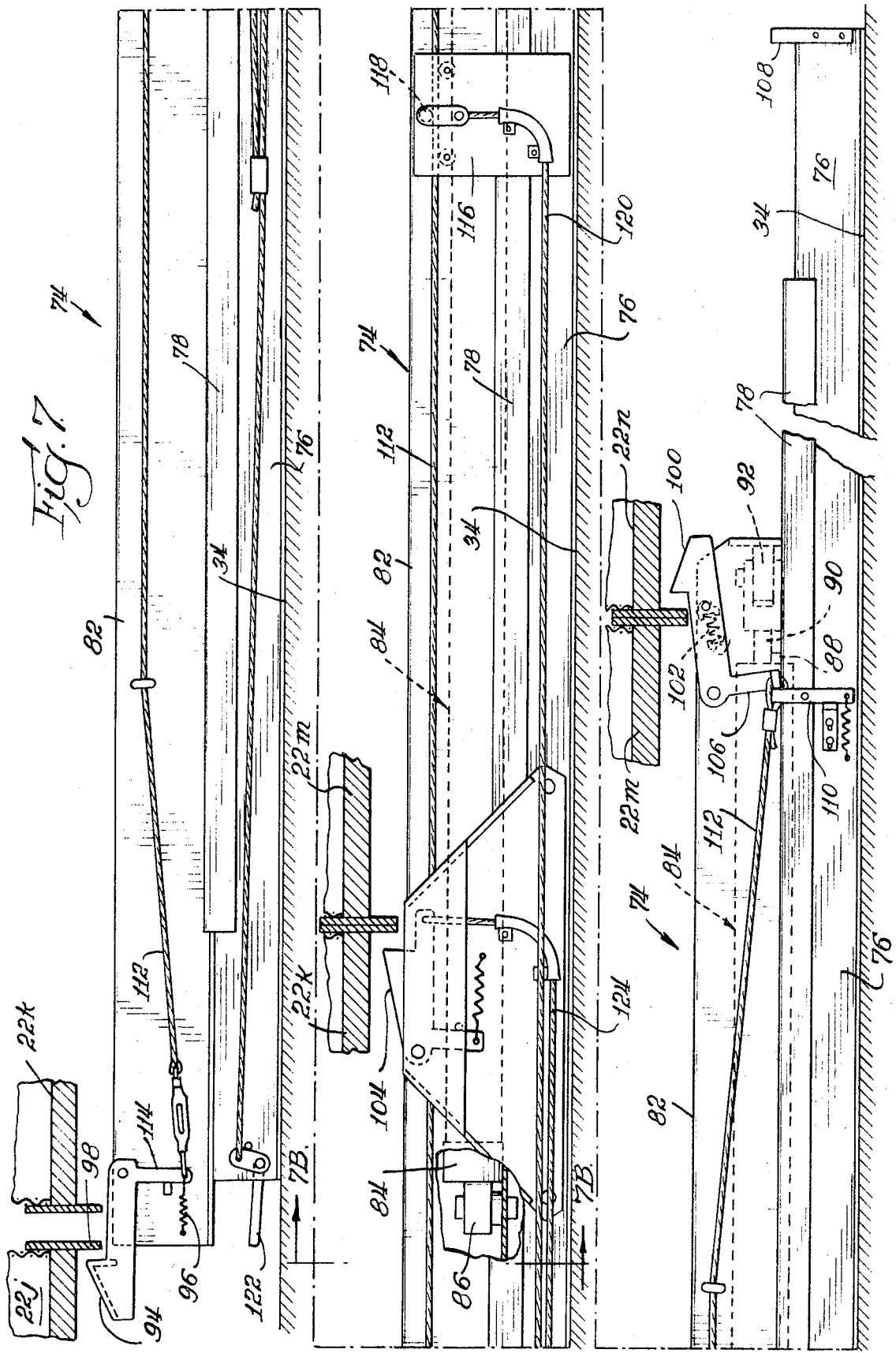

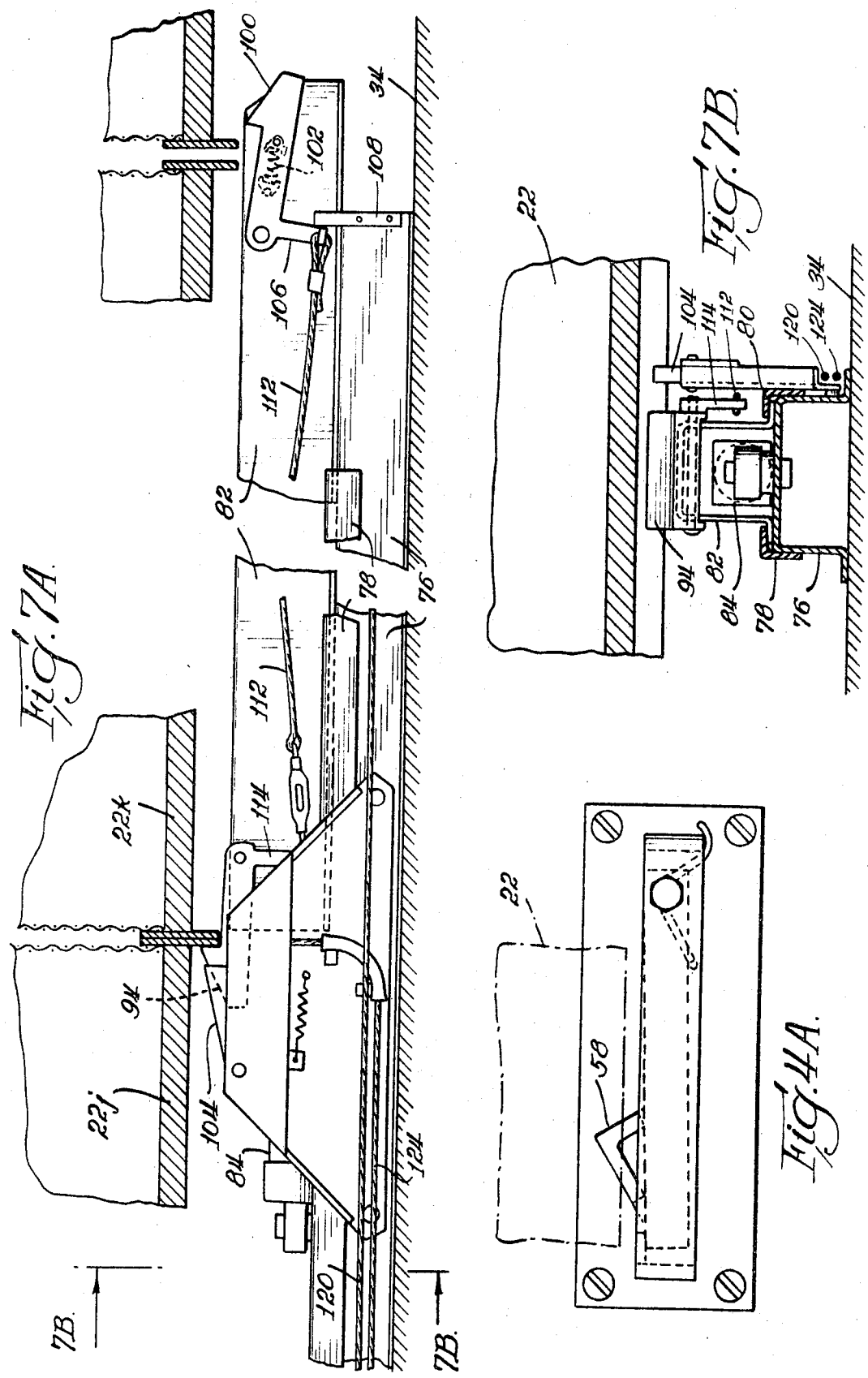

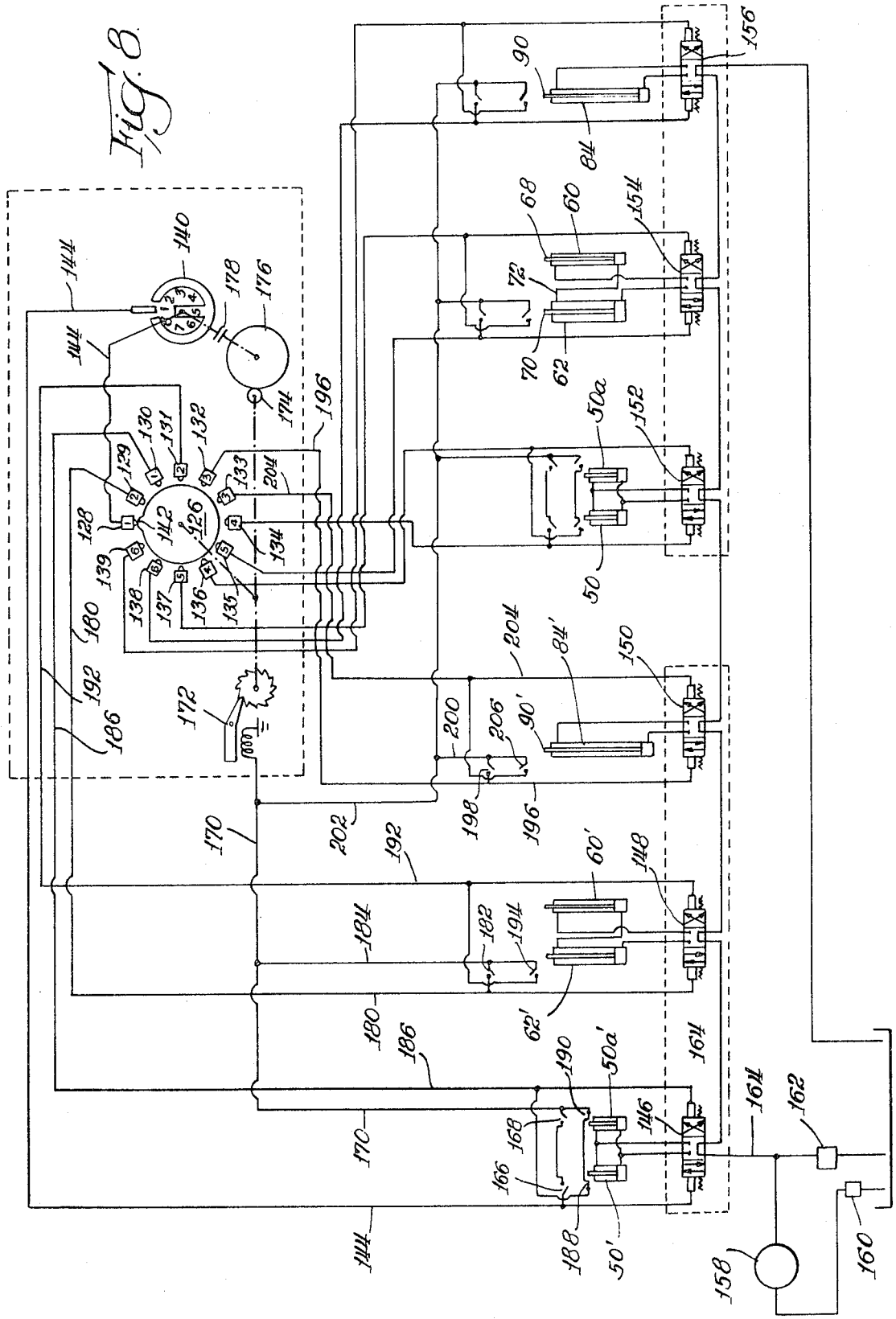

AUTOMATIC FREIGHT HANDLING APPARATUS FOR HIGHWAY TRAILERS

BRIEF SUMMARY OF THE INVENTION

Highway trailers are commonly utilized for transporting a number of different freight shipments bound for different destinations. Such shipments may be contained in separate cargo containers such as conventional cargo cages which are mounted on wheel casters and have three upright wall members with one side left open for loading freight into the cage and unloading the same. Most highway trailers are constructed with a rear door for loading the trailer and unloading the same. It is also known to construct a highway trailer which can be loaded and unloaded from the front of the trailer to one side of the cab. In any event, considerable inconvenience is involved when a cargo cage or other freight container which is to be unloaded is not located adjacent the door of the trailer.

It is an object of the present invention to provide automatic freight handling apparatus which moves a plurality of individual cargo containers in a highway trailer along a predetermined endless path therein so that any selected one of the containers can be located in a loading and unloading position.

In accordance with a preferred embodiment of the invention, the available space within the highway trailer is substantially filled with a plurality of cargo cages with the exception of one open space sufficient to accommodate one of the cargo cages. The location of the open space changes as the cargo cages are moved around within the highway trailer in accordance with the present invention.

More specifically, the plurality of cargo cages are arranged within a highway trailer in two longitudinal side-by-side rows, i.e., a left-hand row and a right-hand row. In any given position of the several cargo cages, one of the rows will have an empty space of either the front or rear end thereof. For example, in a total of nine cargo cages are utilized in a given installation, at any given time one longitudinal row will contain five cargo cages and the other row will contain four such cages.

The preferred embodiment of the present invention includes two longitudinally movable ram members which cooperate respective with the left and right-hand rows of cargo containers. The two longitudinal ram members are disposed generally at opposite sides of the highway trailer and act in opposite directions to shift a corresponding row of containers longitudinally by an amount approximately equal to the length of one container. There are also provided a pair of transversely movable members, one being located at the front end of the trailer and the other at the rear end thereof. Each of the two transversely movable members operates to shift a cargo container at the end of one longitudinal row of containers to a previous empty space at the adjacent end of the other row of containers.

By a proper sequential operation of the two longitudinal ram members and the two transversely movable members the plurality of cargo containers are shifted around the highway trailer in an intermittent manner along an endless path until a selected container is located in a predetermined loading and unloading position. Such operations are performed automatically through actuation of a control box and they may be performed while the trailer is in route to a destination at which freight contained within a given one of the cargo containers is to be unloaded.

The foregoing and other objects and advantages of the invention will be apparent from the following description of a preferred embodiment thereof, taken in conjunction with the accompanying drawings.

DESCRIPTION OF THE DRAWINGS

FIG. 1 is a schematic top plan view of a highway trailer, the top of the trailer being removed, showing a plurality of cargo containers arranged within the trailer in accordance with the present invention;

FIG. 2 is a rear elevational view of the highway trailer of FIG. 1;

FIG. 2A is a perspective view of a cargo container of the type shown positioned in the highway trailer in FIGS. 1 and 2;

FIG. 3 is a vertical transverse sectional view taken approximately along the line 3—3 of FIG. 1 showing a transversely movable dolly member located beneath a cargo container positioned at the rear end of the left-hand row of containers, the wheels of the cargo container being in straddled relation to the transversely movable member;

FIG. 4 is a horizontal section showing the transversely movable dolly member of FIG. 3 in top plan, the dolly member being shown in its normal position in the left-hand portion of the drawing and being shown moved transversely to the right side of the trailer in the right-hand portion of the drawing;

FIG. 4A is a detail side elevational view of a latch member for preventing accidental transverse movement of a cargo container which is located adjacent to the latch member at an end of one of the two rows of containers;

FIG. 5 is a fragmentary vertical sectional view taken approximately along the line 5—5 of FIG. 4;

FIG. 6 is a view similar to FIG. 3 showing the transversely movable dolly member supporting a cargo container off the trailer floor and in the process of moving the container to a position at the rear end of the right-hand row of containers;

FIG. 7 is a vertical longitudinal sectional view taken approximately along the line 7—7 of FIG. 1 showing longitudinally movable ram mechanism for moving in a forward direction a group of cargo containers arranged in the right-hand row within the highway trailer, the drawing being split into three sections which should be considered as being in end-to-end relation;

FIG. 7A is a fragmentary vertical longitudinal sectional view showing the advanced positions of pull pawl and restraining pawl means on the longitudinal ram mechanism of FIG. 7 after the latter has advanced to its forward extended position;

FIG. 7B is a vertical transverse sectional view taken approximately along the line 7B—7B of FIG. 7A; and FIG. 8 is a schematic wiring and hydraulic circuit diagram illustrating control mechanism which effects automatic operation of the apparatus of the present invention.

Now, in order to acquaint those skilled in the art with the manner of making and using our invention, we shall describe, in conjunction with the accompanying drawings, a preferred embodiment of the invention.

DETAILED DESCRIPTION OF THE INVENTION

Referring now to the drawings, there is shown in FIG.

1 a highway trailer body 10 having a front wall 12 and a rear door 14, the trailer being of the type which is loaded and unloaded from the rear thereof. The trailer 10 further includes a left-hand side wall 16 and a right-hand side wall 18, and a longitudinal center divider 20 serves to separate the left and right sides of the trailer into two longitudinal areas. Extra space is provided between the right-hand wall or partition 18 and the outer trailer side wall 19 and such space may be utilized for storing long freight which cannot be accommodated within the cargo containers.

A plurality of cargo containers 22 are positioned within the trailer 10 and arranged therein in two longitudinal rows which are partially separated by the divider member 20. In the particular embodiment being described herein there are nine cargo containers 22 positioned within the trailer 10 and each such container comprises a conventional cargo cage (see FIG. 2A) of the type having three upright walls and one open side for loading freight into the cage and unloading the same. The cargo cages 22 are mounted on wheels two of which are on casters and two of which are rigid and thus the cage can be rolled on the floor of the trailer 10. Each of the cages is arranged so that the open side thereof faces the right-hand trailer wall 18.

It will be understood that the number of cargo cages 22 utilized in a given application of the present invention can be varied and nine cages are illustrated in the embodiment being described merely by way of example. In accordance with our preferred embodiment however an odd number of cages is utilized so that the available space within the trailer 10 may be substantially filled with the cargo cages with the exception of one empty space sufficient to accommodate one of the cages as the same are moved around in the trailer along an endless path. In the particular position of the cages as illustrated in FIG. 1, there is shown a left-hand row of five cages which beginning at the rear of the trailer are identified as 22a, 22b, 22c, 22d and 22e. There is further shown a right-hand row of four cages which beginning at the front of the trailer are identified as 22f, 22g, 22h and 22i.

In order to move the cages 22 around the trailer 10 from the positions shown in FIG. 1, the cage 22a is shifted transversely to the right so that it occupies the space shown to be empty in the drawing. The left-hand row of cages is then moved rearwardly so as to leave an empty space at the forward end of the left-hand row. The cage 22f may then be shifted transversely to the left so as to be positioned at the forward end of the left-hand row, after which the right-hand row of cages is moved forwardly so as to again leave an empty space at the rear end of the right-hand row as shown in FIG. 1.

The foregoing sequence of operations causes each cage 22 to be advanced one position, and it will be understood that by repeating the series of movements described above any desired one of the cages 22 may be located at the rear end of the left-hand in the position occupied by the cage 22a as illustrated in FIG. 1 with the space immediately to the right thereof unoccupied. In the particular application being described herein, the position occupied by the cage 22a is the loading and unloading position, and because each cage is arranged with its open side facing the right-hand trailer wall 18, it will be seen that a man can enter the empty space from the rear of the trailer and readily load freight into the cage 22a or unload the same.

In the example described above cages were moved around the trailer along an endless path in a counter-clockwise direction. However, the present invention is not limited to a particular direction of movement as the same can be varied as desired to suit a given application.

In accordance with the embodiment described hereinabove, the several cargo cages 22 may remain on the trailer and be loaded and unloaded seriatim by causing the same to be positioned at the rear of the left-hand row in the space occupied by the cage 22a in the illustration of FIG. 1. However, it will be understood that the cages 22 can be removed from the trailer when desired. In particular, at a given destination a loaded cage may be removed from the trailer and replaced with an empty cage from a previous delivery at the same destination. It will however be recognized that in the particular system described herein all of the cages must be present in order that they may be moved automatically around the trailer in the intended manner.

We will now describe the apparatus of the present invention for moving the several cages 22 around the trailer in the manner described hereinabove. FIGS. 3-6 illustrate a transversely movable dolly member 24 for shifting a cargo cage 22 from the end of one row of cages to the end of the other row thereof. It will be understood that in the embodiment shown in FIG. 1 there are provided two such dolly members. One dolly is located at the forward end of the trailer in alignment with the right-hand row of cages and moves to the left to transfer a cage 22 from the position shown occupied by the cage 22f to the position shown occupied by the cage 22e, after which the dolly returns to its home position in alignment with the right-hand row of cages. In addition, a similar dolly member 24 is located at the rear end of the trailer in alignment with the left-hand row of cages and moves to the right to transfer a cage 22 from a position shown occupied by the cage 22a to the position shown unoccupied in FIG. 1, after which it returns to its home position in alignment with the left-hand row of cages.

Thus, in the embodiment being described herein two transversely movable dolly members are required, one being located at the forward end of the trailer in alignment with one of the two rows of cages 22 and the other being located at the rear end of the trailer in alignment with the other of the two rows of cages. Since the two dolly members 24 are substantially identical in construction, only one such device need be described herein in conjunction with FIGS. 3-6.

FIG. 3 shows the dolly member 24 positioned at the rear end of a trailer in alignment with a left-hand row of cages 22 therein and the dolly member is located immediately beneath the last cage in the left-hand row. It will be seen that the cage 22 is provided with a cage floor 26 supported on four wheels 28 which are in straddled relationship to the dolly member 24, and it will be noted that clearance is provided between the cage floor 26 and the top of the dolly member 24. It will therefore be understood that when the dolly member 24 is located in its normal position as shown in FIG. 3, and when such position is not occupied by a cage 22, all of the cages in the left-hand row can be moved rearwardly thereby causing the rearmost cage in the row to be disposed in straddled relation immediately over the dolly member 24.

The dolly member 24 includes a body or frame indicated generally at 30 which is mounted on four steel wheels 32 for transverse rolling movement on the floor 34 of the trailer 10. A pair of rods 36 and 38 are journaled on the dolly frame 30, and a pair of left arms 40 and 42 are mounted on the rods respectively for pivotal movement thereon. The left arm 40 includes a first arm member 44 on which a lifter pad 46 is mounted, and a second arm 48 which extends downwardly for connection to one end of a lift cylinder 50. In a similar manner, the oppositely disposed lift arm 42 includes a first arm member 52 on which a lifter pad 54 is mounted, and a second arm 56 which extends downwardly for connection to the opposite end of the lift cylinder 50.

The lift cylinder 50 is in effect a floating hydraulic cylinder which extends when actuated so as to pivot the lift arm 40 in a clockwise direction and the lift arm 42 in a counterclockwise direction thereby raising the lifter pads 46 and 54 so that they engage the underside of the cargo cage 22 and lift the same a slight distance above the trailer floor 34. As best shown in FIG. 4, the lift cylinder 50 is positioned at the rearward end of the dolly frame 30, and the lifter pads 46 and 54 are located at the two rearward corners of the dolly. In addition, a second lift cylinder 50a is located at the forward end of the dolly frame 30 and actuates two lift arms so as to raise a pair of lifter pads 46' and 54' located at the forward corners of the dolly frame 30.

It will thus be understood that upon actuation of the two hydraulic cylinders 50 and 50a the four lifter pads 46, 54, 46' and 54' will be raised so as to lift the cage 22 above the trailer floor 34 thereby causing the same to be supported by the dolly member 24. Stop members are shown at 57 and 57' in FIG. 3 to limit the movement of each of the arms 40 and 42 to assure that each of the arms is pivoted to its raised position when the lift cylinder is fully extended. However, it is not essential that such pivotal movement of the two arms 40 and 42 occur in any precisely timed relation to one another. It will further be noted that when the cage 22 is located at the rear end of the left-hand row of cages it is held in position by a spring-loaded latch member 58 which is mounted from the trailer wall 16. The latch member 58 is rigid against movement in a transverse direction but is yieldable when engaged by a cage moving in a longitudinal direction so as to permit a cage which is moved longitudinally into the adjacent corner area of the trailer to move past the member 58 into latched relation therewith. The raising of the cage 22 from the trailer floor 34 causes the cage to be released from the latch member 58 so as to permit the cage to be moved transversely to the right as will be described hereinbelow. In accordance with a preferred embodiment of the present invention each of the four corner areas of the trailer 10 is equipped with a latch 58 of the type shown in FIG. 3.

FIG. 4 illustrates a pair of cross cylinders 60 and 62 which serve to move the dolly member 24 from its left-hand position as shown in FIG. 3 to its right-hand position as shown in FIG. 6. It will be seen that the cylinders 60 and 62 are arranged in crossed fashion with the cylinder 60 positioned to cross over the cylinder 62. The left-hand end of the cylinder 60 as shown at 64 and the left-hand end of the cylinder 62 as shown at 66 are both anchored to the trailer floor 34. The rod 68 of the cylinder 60 is secured to the dolly frame 30 adjacent the forward right-hand corner thereof and the rod 70 of the cylinder 62 is secured to the dolly frame 30 adjacent the rear right-hand corner thereof.

The cylinders 60 and 62 are actuated simultaneously so as to extend to the positions shown in the right-hand portion of FIG. 4 and thereby move the dolly 24 to its right-hand position as shown therein. Reference to the schematic illustration of the interconnection between the cylinders 60 and 62 in FIG. 8 will indicate the manner in which the same are extended conjointly in order to effect a transverse shifting of the dolly 24. Thus, hydraulic fluid under pressure is supplied to the piston end of the cylinder 62 so as to extend the piston rod 70, and hydraulic fluid ejected from the rod end of cylinder 62 is conducted through a closed line 72 to the piston end of cylinder 60 so as to extend the piston rod 68.

The net area of the rod end of the larger cylinder 62 is made equal to the area of the piston end of the cylinder 60 so that the two piston rods 68 and 70 will extend conjointly at the same rate of travel. When the cross cylinders 60 and 62 are to be retracted, hydraulic fluid under pressure is supplied to the rod end of the smaller cylinder 60 so as to retract the piston rod 68 and the fluid ejected from the piston end of the cylinder 60 is conducted in the opposite direction through the aforementioned closed circuit 72 to the rod end of the cylinder 62 thereby retracting the rod 70 at the same rate of travel.

It will now be understood the two cylinders 60 and 62 each have one end pivotally anchored to the trailer floor 34 and one end pivotally connected to the dolly frame 30 so that upon conjoint extension of the two cylinders the same will move the dolly 24 transversely and thereby effect similar movement of the cage 22 which is lifted and transported by the dolly. Thereafter the lift cylinders 50 and 50a are retracted to lower the cage 22, and as will be explained more fully hereinafter the lowering of the cage causes the forward end thereof to be engaged with a pull pawl of a longitudinal ram mechanism in preparation for a subsequent longitudinal movement of the cage. After the cage 22 is lowered by the dolly 24, the dolly is returned to its original position of FIG. 3. It should be noted that with the dolly 24 located in the position of FIG. 3, it is then possible for the remaining four cages 22 in the left-hand row to be moved longitudinally rearwardly whereby the rearmost cage will be moved over the dolly 24 in straddled relation therewith. FIGS. 4 and 5 illustrate a fixed transverse guide rail 71 which cooperates with a guide bracket 73 on the front end of the dolly 24 to guide the latter during its transverse movement. As shown in FIG. 4, the fixed guide rail 71 is formed in three sections so as to leave spaces to accommodate the wheels 28 of the cargo containers when the latter are moved in a longitudinal direction.

Reference is now made to FIG. 7 which illustrates a longitudinally movable ram mechanism 74. For example, in the embodiment of FIG. 1, after movement of the cage 22a to the space shown unoccupied therein, a longitudinal ram mechanism as shown in FIG. 7 moves the remaining four cages in the left-hand row rearwardly an amount approximately equal to the length of one cage, and a similar mechanism is mounted on the trailer floor on the right-hand side for advancing four of the cages in a forward direction when there is an unoccupied space at the forward end of the right-hand row. The two longitudinally movable ram mechanisms are of the same construction and thus only one is described.

As shown in FIGS. 7 and 7B, the ram mechanism 74 includes a longitudinal guide channel 76 of inverted U-shape which is anchored to the trailer floor 34. The guide channel 76 has a pair of longitudinal angle members 78 and 80 fixed to the top thereof for slidably retaining a slide channel 82, the latter also being of generally inverted U-shaped configuration. A longitudinal cylinder 84 is disposed along the top surface of the guide channel 76 so as to be accommodated within the interior of the slide channel 82. One end of the cylinder 84 is anchored to the top of the guide channel at 86 and the opposite end of the cylinder is anchored to the top of the guide channel at 88. A rod 90 shown in retracted position in FIG. 7 extends from the right-hand end of the cylinder 84 and is connected to the right-hand end of the slide channel 82 as shown at 92. It will thus be understood that upon actuation of the hydraulic cylinder 84 to extend the rod 90, the slide channel 82 will be moved along the top of the guide channel 76. The stroke of the rod 90 is approximately equal to the length of one of the cages 22 for the purpose of moving a row of four cages in a longitudinal direction as previously described.

The longitudinal ram mechanism 74 of FIG. 7 is shown in conjunction with four cargo cages indicated as 22j, 22k, 22m and 22n, and as viewed in the drawing the longitudinal ram mechanism is intended to move the foregoing four cages to the right by an amount approximately equal to the length of one of the cages. At the left-hand end of the slide channel 82 as viewed in FIG. 7 there is mounted a pull pawl 94 which is biased to a clockwise latching position by a tension spring 96. It will be seen that the cargo cage 22j is constructed with a transverse frame member 98 on the leading end thereof and that when in its clockwise latching position the pull pawl 94 is operatively engaged with the frame member 98. It should further be understood that such engagement will occur when the cage 22j is lifted by one of the dolly members 24 and after being moved transversely is lowered to the trailer floor 34 in the position illustrated in FIG. 5.

At the opposite right-hand end of the slide channel 82 there is mounted a restraining pawl 100 which is loaded by an over-center spring 102. The spring 102 is mounted so that when the pawl 100 is moved to its counterclockwise latching position it will be biased to that position by the spring 102 and when it is moved to its clockwise released position it will be spring-biased to the latter position. The restraining pawl 100 is positioned so that it engages with the left-hand end of the leading cage 22n.

The cooperative action of the pull pawl 94 and the restraining pawl 100 serves to hold together in a group the four cages 22j, 22k, 22m and 22n. As a result, the four cages are maintained under control at all times including the time during which such cages are being moved longitudinally along the trailer floor 34. A further safety pawl 104 is located so as to engage immediately behind the leading end of the cage 22k. Unlike the pawls 94 and 100 which are mounted on the slide channel 82 for movement therewith, the safety pawl 104 is mounted from the fixed guide channel 76.

When the cylinder 84 is actuated to extend the rod 90, the slide channel 82 is moved longitudinally to the right as viewed in FIG. 7 so that it slides along the guide channel 76 carrying with it the leading restraining pawl 100 and the trailing pull pawl 94. The pull pawl 94 causes the trailing cage 22j to be moved along with the slide channel 82, and the cage 22j in turn effects conjoint movement of the three other cages 22k, 22m and 22n. As noted hereinabove, the restraining pawl 100 keeps the four cages together so that they move as a group.

When the slide channel 82 reaches the end of its stroke so as to occupy the position shown in FIG. 7A, a depending arm 106 on the restraining pawl 100 engages a fixed actuator arm 108 on the guide channel 76 which pivots the pawl 100 to its clockwise release position in which it is then biased by the overcenter spring 102. Thereafter, the rod 90 is retracted so as to return the slide channel 82 to its original position. During such return movement the pawl 100 remains in its release position until it engages fixed actuator arm 110 on the guide channel 76 which pivots the pawl 100 back to its counterclockwise latched position. Since the cages 22 will have been advanced to the right as viewed in FIG. 7, it will be understood that the pawl 100 will then be latched immediately in front of the trailing end of the cage 22m.

During the above-mentioned return of the slide channel 82, the pull pawl 94 which is spring-loaded in its latched position will simply be cammed downwardly as it passes beneath the cage 22j until it assumes a position wherein it will be latched with leading end of the next cage which is moved by one of the dollies 24 to the position previously occupied by the cage 22j. In addition, the advancement of the cage 22j by the foregoing actuation of the cylinder 84 will cause the safety pawl 104 to be latched immediately behind the leading end of the cage 22j so that the cage 22j will be restrained against movement back into the temporarily unoccupied space immediately behind it.

It will be understood that the pawls 94, 100 and 104 latch and unlatch automatically without any manual operation being required. However, there is provided a manual release mechanism for releasing the several pawls in the event it is desired to remove one or more cages 22 from the trailer. The manual release mechanism includes a cable 112 which extends from a depending arm 114 on the pawl 94 through a release equalizer bracket 116 mounted on the guide channel 76 and then to the depending arm 106 on the pawl 100. The bracket 116 mounts a vertically movable pulley or finger member 118 which overlies the cable 112, and the member 118 is controlled by a pull cable 120 which extends back to a release lever 122 mounted at the end of the guide channel 76. A further pull cable 124 extends from the safety pawl 104 to the release lever 122. Consequently, upon manual movement of the release lever 122 in a counterclockwise direction as viewed in FIG. 7 the three pawls 94, 100 and 104 will all be moved to their released positions.

Reference is now made to FIG. 8 in connection with the following description of the electrical and hydraulic control mechanism for effecting automatic operation of the forward and rearward dolly members 24 and the left-hand and right-hand longitudinal ram mechanisms 74. As depicted in FIG. 8, the dolly lift cylinders for the right side of the trailer are indicated at 50 and 50a, the cross cylinders for the corresponding dolly are indicated at 60 and 62, and the longitudinal ram cylinder is indicated at 90. As previously explained, the left side of the trailer is equipped with corresponding components which are indicated in FIG. 8 by corresponding primed numerals.

A rotatable program cam 126 cooperates with twelve switch members 128 through 139 to control the automatic operation in proper sequence of the two dolly members 24 and the two longitudinal ram members 74. During one complete cycle of operations each of the cargo cages 22 is advanced one position within the highway trailer. A control knob 140 is manually rotated to initiate the operation of the freight handling apparatus, and the position to which the control knob is rotated determines the number of complete cycles through which the mechanism is operated before it is automatically stopped.

It will be obvious that the proper setting of the control knob 140 therefore depends upon the number of complete cycles required in order to locate a desired cargo cage in the loading and unloading position in the trailer. The control knob 140 as illustrated in FIG. 8 has eight settings, but it will be appreciated that the number of settings will depend upon the number of cargo cages utilized in a given freight handling system and preferably is sufficient to position any one of the cages in the trailer in the handling and unloading position.

The program cam 126 has a projecting portion 142 for closing whichever of the switches 128–139 it is in contact with. In the embodiment illustrated in FIG. 8 the projection 142 engages and closes the switch 128 when the program cam 126 is in its home position as shown. The switch 128 is connected to a 12 volt d.c. power source, as are each of the twelve switches 128–139. The line 144 leading from the switch 128 is connected with the control knob switch 140 so that the line 144 can be closed only when the control knob has been manually rotated from its home position.

It will now be understood that when the manual control knob 140 is rotated to an operative setting it completes the circuit 144 which is connected to one side of a solenoid valve 146 causing the latter to move to its right-hand position as viewed in FIG. 8. There are also provided similar solenoid valves 148, 150, 152, 154 and 156 to be explained more fully hereinafter. In addition, there are provided in the hydraulic circuit a pump 158, filter 160 and overload valve 162. A hydraulic line 164 extends from the pump 158 to each of the foregoing six solnoid valves so that each valve will be operative to supply hydraulic fluid under pressure to its corresponding components when it is actuated to the left or right from the neutral or inoperative position illustrated in FIG. 8.

When the solenoid valve 146 is moved to its right-hand position as above described, fluid under pressure is conducted to the piston ends of the lift cylinders 50' and 50a' so as to produce a lifting action by the corresponding dolly 24. The completion of the lifting operation is sensed by two limit switches 166 and 168 which complete a circuit from the line 144 to a line 170 causing actuation of a solenoid ratchet mechanism 172. The ratchet mechanism 172 is operatively connected with the program cam 126 so as to advance the latter in a clockwise direction until the projection 142 engages and closes the switch 129. It will also be noted that the ratchet mechanism 172 acts through a pinion 174, gear 176 and slip clutch 178 to return the control knob 140 a small predetermined increment toward its home position.

Upon the closing of the switch 129 as above described, a circuit is completed along the line 180 to actuate the solenoid valve 148 to its right-hand position causing fluid under pressure to be connected to the piston ends of the cross-cylinders 60' and 62' which move the raised dolly 24 transversely. At the completion of the tranverse movement of the dolly 24 a limit switch 182 is closed completing a circuit from the line 180 to a line 184 and the line 170 thereby effecting another advance of the program cam 126 to close the switch 130 and also effecting a further incremental return of the control knob 140.

The closing of the switching 130 completes a circuit along a line 186 to actuate the solenoid valve 146 to its left-hand position thereby causing fluid under pressure to be conducted to the rod ends of the cylinders 50' and 50a' so as to lower the dolly 24 and thereby lower to the trailer floor 34 the cargo cage which had been transported transversely by the dolly. It should be understood that after the initial lifting of the dolly the solenoid valve 146 returned to its neutral position so as to maintain the dolly in its raised position until the foregoing closing of the switch 130. When the dolly 24 has fully moved to its lowered position, limit switches 188 and 190 are closed so as to complete a circuit from the line 186 to the line 170 thereby advancing the program cam 126 to close the switch 131 and also to effect a further incremental return of the control knob 140.

When the switch 131 is closed a circuit is completed along the line 192 so as to actuate the solenoid valve 148 to its left-hand position thereby causing fluid under pressure to be conducted to the rod ends of the cross cylinders 60' and 62' so as to return the dolly 24 to its original position. The return of the dolly 24 closes a limit switch 194 completing a circuit from the line 192 through line 184 and 170 thus advancing the program cam 126 to close the switch 132 and also effecting further incremental return of the control knob 140.

The closing of the switch 132 completes a circuit along a line 196 so as to actuate the solenoid valve 150 to its right-hand position thereby causing fluid under pressure to be conducted to the piston end of the longitudinal ram cylinder 84' so as to effect longitudinal movement of four of the cargo cages 22 in the manner previously described herein. Upon the completion of such longitudinal movement a limit switch 198 is closed thus completing a circuit from the line 196 through lines 200, 202 and 170 to the ratchet solenoid 172 thereby advancing the program cam 126 to close the switch 133 and also effecting incremental return of the control knob 140.

When the switch 133 is closed it completes a circuit along a line 204 so as to actuate the solenoid valve 150 to its left-hand position thereby causing fluid under pressure to be conducted to the rod end of the longitudinal ram cylinder 84' so as to retract the latter and thus return the slide channel 82 to its original position in the manner previously described in conjunction with FIG. 7. The return of the slide channel 82 closes a limit switch 206 so as to complete a circuit from the line 204 through the lines 200, 202 and 170 to the ratchet solenoid 172 thereby advancing the program cam 126 to close the switch 134 and effect incremental return of the control knob 140.

The operations described above occur during one-half revolution of the program cam 126 and relate to the functions performed by one dolly 24 and one longitudinal ram mechanism 74. It will be understood without further description of the control mechanism of FIG. 8 that during the second half of one revolution of the program cam 126 the foregoing operations are repeated with respect to the second dolly member 24 and the second longitudinal ram mechanism 74. After one complete revolution of the program cam 126 each of the cargo cages 22 will have been advanced one position. If the control knob 140 was initally set at "1" then the control knob will have been returned to its home position at the completion of one revolution of the program cam 126 so that the switch associated with the control knob will open the line 144 and terminate the automatic operation of the mechanism. If the control knob was initially set at a setting above "1," the switch associated with the control knob 140 will remain closed and the program cam will continue through a number of complete revolutions controlled by the setting of the knob 140. It should be understood that the precise point in the cycle at which the operation is stopped depends upon which of the switches 128–139 is electrically connected with the control knob switch 140 and will vary depending upon the particular application.

We claim:

1. Freight handling apparatus for automatically moving freight along an endless path within a highway trailer or the like comprising, in combination, a plurality of cargo containers each supported on a plurality of wheels and arranged in two longitudinal side-by-side rows on the floor of said highway trailer so as to leave one unoccupied space in one of said rows sufficient to accommodate one of said cargo containers, first transversely movable means located at the forward end of said trailer for moving a cargo container from the forward end of one of said rows to the forward end of the other of said rows, first longitudinally movable means for advancing the remaining cargo containers in said one row forwardly an amount approximately equal to the length of one of said cargo containers, second transversely movable means located at the rear end of said trailer for moving a cargo container from the rear end of said other row to the rear end of said one row, and second longitudinally movable means for advancing the remaining cargo containers in said other row rearwardly an amount approximately equal to the length of one of said cargo containers, said cargo containers being supported solely by their own wheels during longitudinal rolling movement forwardly and rearwardly along the floor of said highway trailer.

2. Freight handling apparatus as defined in claim 1 wherein one of said transversely movable means is normally positioned in alignment with one of said rows and the other of said transversely movable means is normally positioned in alignment with the other of said rows.

3. Freight handling apparatus as defined in claim 1 where each of said longitudinally movable means advances a plurality of cargo containers in a longitudinal direction by engaging with the trailing one of said cargo containers and advancing the same in said longitudinal direction thereby causing said trailing container to push the remaining cargo containers in said longitudinal direction.

4. Freight handling apparatus as defined in claim 1 where each of said cargo containers is moved along an endless rectangular path within said trailer, there being provided an odd number of said cargo containers in order to provide in said endless path a single unoccupied space the location of which changes as said cargo containers are moved along said endless path.

5. Freight handling apparatus as defined in claim 1 including automatic control means for controlling the number of complete cycles of operation which are automatically performed by said apparatus, each of said cargo containers being advanced one position along said endless path during one complete cycle of operation whereby depending upon the number of cycles of operation of said apparatus any selected one of the cargo containers within said trailer may be located in a predetermined loading and unloading position therein.

6. Freight handling apparatus as defined in claim 2 where each of said first and second transversely movable means includes lifting means for elevating a cargo container above the trailer floor during transverse movement of said cargo container and for lowering said cargo container back to said trailer floor after completion of said transverse movement thereof.

7. Freight handling apparatus as defined in claim 6 where each of said first and second transversely movable means includes wheels which permit said transversely movable means to roll in a transverse direction on said trailer floor.

8. Freight handling apparatus as defined in claim 6 where each of said first and second transversely movable means is located approximately on the longitudinal centerline of a corresponding row of cargo containers and is dimensioned to fit beneath one of said cargo containers whereby when said transversely movable means is located in its normal retracted position with the space above it unoccupied the plurality of cargo containers in said corresponding row may be moved longitudinally toward said transversely movable member thereby moving the leading cargo container in said row over said transversely movable member in straddled relation thereto.

9. Freight handling apparatus as defined in claim 4 wherein stabilizer means is provided in at least one of the four corner areas of said trailer so as to restrain a cargo container positioned in said corner area from moving accidentally to the space to one side thereof when the latter space is unoccupied, said stablizer means being rigid against movement in a transverse direction but being yieldable when engaged by a cargo container moving in a longitudinal direction so as to permit latching engagement with a cargo container when the latter is moved longitudinally into said corner area.

10. Freight handling apparatus as defined in claim 9 where said stabilizer means extends upwardly into latching engagement with a cargo container positioned thereover thereby permitting said cargo container to be released from said stabilizer means by lifting said cargo container a predetermined distance above the trailer floor, said transversely movable means being equipped with means for raising and lowering said cargo container.

11. Freight handling apparatus as defined in claim 3 where each of said longitudinally movable means includes a restraining member on the leading end thereof for latching engagement with the leading one of said plurality of cargo containers whereby the latter are held together as a group during longitudinal movement thereof.

12. Freight handling apparatus as defined in claim 11 including safety latch means mounted in a fixed position and engageable with the trailing one of said plurality of cargo containers at the completion of said longitudinal movement thereof for preventing said trailing cargo container from movement in the opposite direction back to the position it previously occupied.

13. Freight handling apparatus as defined in claim 3 including latch means on each of said longitudinally movable means for engaging with the trailing one of said cargo containers for advancing the latter in said longitudinal direction, said latch means having an upwardly extending member which is automatically positioned in an operative relationsip with said trailing cargo container when the latter is lowered from a position directly above said latch means, said transversely movable means including means for effecting raising and lowering said cargo container.

14. Freight handling apparatus as defined in claim 6 where said lifting means includes a pair of horizontally disposed lift cylinders each of which is operatively connected to actuate a corresponding pair of lift members, there being one lift member positioned approximately at each of the four corner portions of said transversely movable member for upward movement into lifting engagement with a cargo container disposed above said transversely movable member.

15. Freight handling apparatus as defined in claim 3 where each of said longitudinally movable means comprises fixed longitudinal guide means, slide means movable along the length of said guide means, cylinder means operatively connected with said slide means for advancing the slide means along said guide means and for returning said slide means to its original position, and latch means on said slide means for engagement with the trailing one of a plurality of cargo containers to be advanced by said longitudinally movable means.

16. Freight handling apparatus as defined in claim 15 where first latch means is mounted on said slide means for operative propelling engagement with the trailing one of said plurality of cargo containers and second latch means is mounted on said slide means for operative restraining engagement with the leading one of said plurality of cargo containers whereby said first and second means hold said plurality of cargo containers together for conjoint movement.

17. Freight handling apparatus for automatically moving freight along an endless rectangular path within a highway trailer or the like comprising, in combination, a plurality of cargo containers arranged in two longitudinal side-by-side rows, there being provided an odd number of cargo containers in order to provide in said endless path a single unoccupied space the location of which changes as said cargo containers are moved along said endless path, said cargo containers each being mounted on wheel means for rolling movement on the floor of said trailer, first transversely movable means located at the forward end of said trailer for moving a cargo container from the forward end of one of said rows to the forward end of the other of said rows, first longitudinally movable means for advancing the remaining cargo containers in said one row forwardly an amount approximately equal to the length of one of said cargo containers, second transversely movable means located at the rear end of said trailer for moving a cargo container from the rear end of said other row to the rear end of said one row, and second longitudinally movable means for advancing the remaining cargo containers in said other row rearwardly an amount approximately equal to the length of one of said cargo containers, said cargo containers being supported solely on said wheel means during longitudinal rolling movement forwardly and rearwardly along said trailer floor, one of said transversely movable means being normally positioned in alignment with one of said rows and the other of said transversely movable means being normally positioned in alignment with the other of said rows.

18. Freight handling apparatus as defined in claim 17 where each of said longitudinally movable means advances a plurality of cargo containers in a longitudinal direction by engaging with the trailing one of said cargo containers and advancing the same in said longitudinal direction thereby causing said trailing container to push the remaining cargo containers in said longitudinal direction.

19. Freight handling apparatus as defined in claim 17 including automatic control means for controlling the number of complete cycles of operation which are automatically performed by said apparatus, each of said cargo containers being advanced one position along said endless path during one complete cycle of operation whereby depending upon the number of cycles of operation of said apparatus any selected one of the cargo containers within said trailer may be located in a predetermined loading and unloading position therein.

20. Freight handling apparatus as defined in claim 17 where each of said first and second transversely movable means includes lifting means for elevating a cargo container above the trailer floor during transverse movement of said cargo container and for lowering said cargo container back to said trailer floor after completion of said transverse movement thereof.

21. A method of moving freight within a highway trailer or the like in order to locate a selected shipment in a predetermined unloading position comprising the steps of arranging a plurality of cargo containers in two longitudinal side-by-side rows within a trailer leaving one unoccupied space in one of said rows sufficient to accommodate one of said cargo containers, said cargo containers each being of a type supported on a plurality of wheels, moving a cargo container transversely from the forward end of one of said rows to the forward end of the other of said rows, longitudinally advancing the remaining cargo containers in said one row forwardly an amount approximately equal to the length of one of said cargo containers, transversely moving a cargo container from the rear end of said other row to the rear end of said one row, longitudinally advancing the remaining cargo containers in said other row rearwardly an amount approximately equal to the length of one of said cargo containers, said cargo containers being supported solely by said wheels during longitudinal rolling movement forwardly and rearwardly along the floor of said highway trailer, and repeating the foregoing steps so as to move said plurality of cargo containers around an endless rectangular path until a selected cargo container is located in a predetermined unloading position in said trailer.

* * * * *